F. ANDERSON AND A. WILD.
DUMPING BODY FOR AUTOMOBILE TRUCKS, WAGONS, FREIGHT CARS, AND OTHER VEHICLES.
APPLICATION FILED APR. 30, 1919.
1,328,805.
Patented Jan. 27, 1920.
3 SHEETS—SHEET 1.
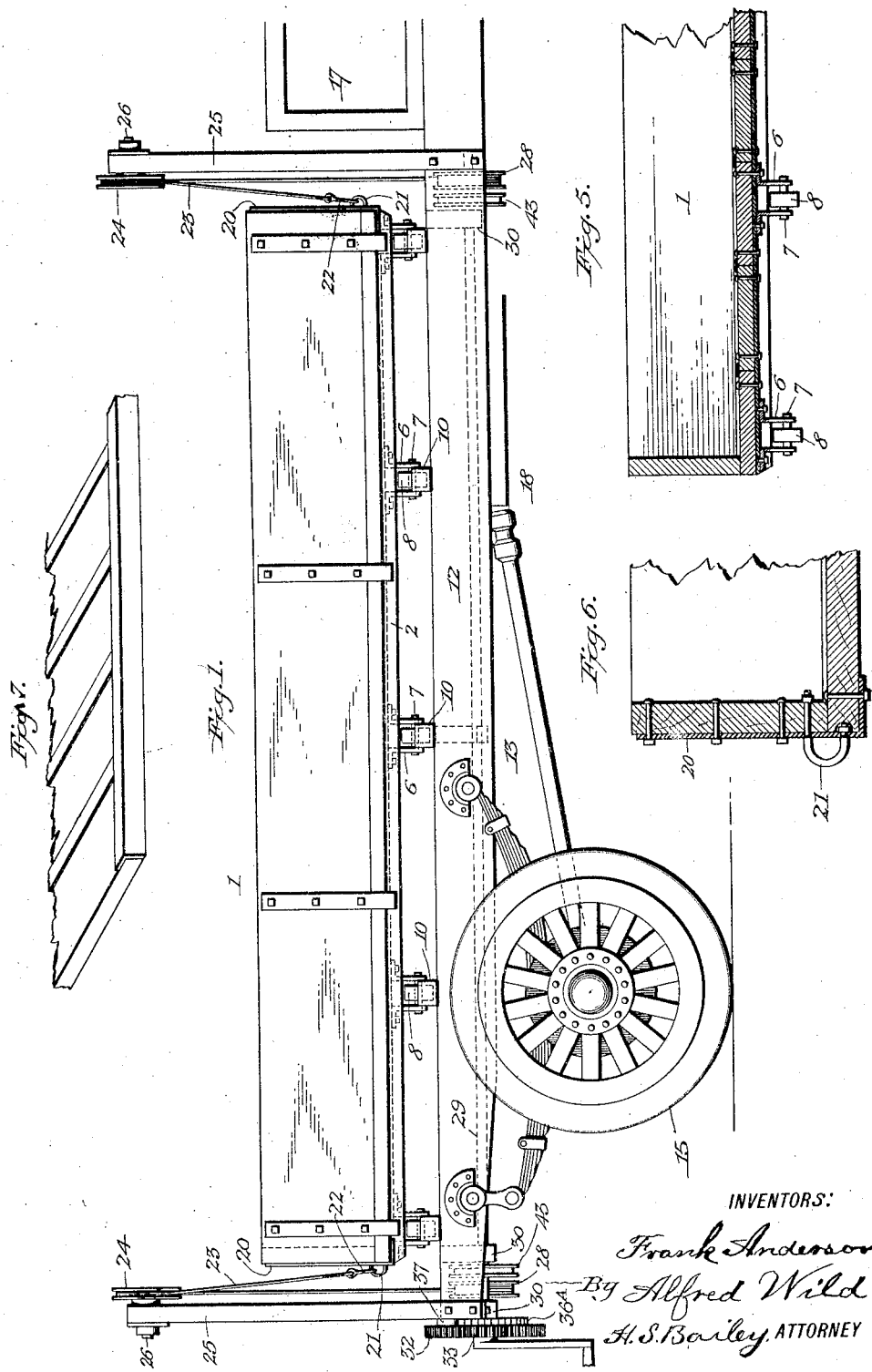
INVENTORS:
Frank Anderson
By Alfred Wild
H. S. Bailey, ATTORNEY F. ANDERSON AND A. WILD.
DUMPING BODY FOR AUTOMOBILE TRUCKS, WAGONS, FREIGHT CARS, AND OTHER VEHICLES.
APPLICATION FILED APR. 30, 1919.
1,328,805.
Patented Jan. 27, 1920.
3 SHEETS—SHEET 2.
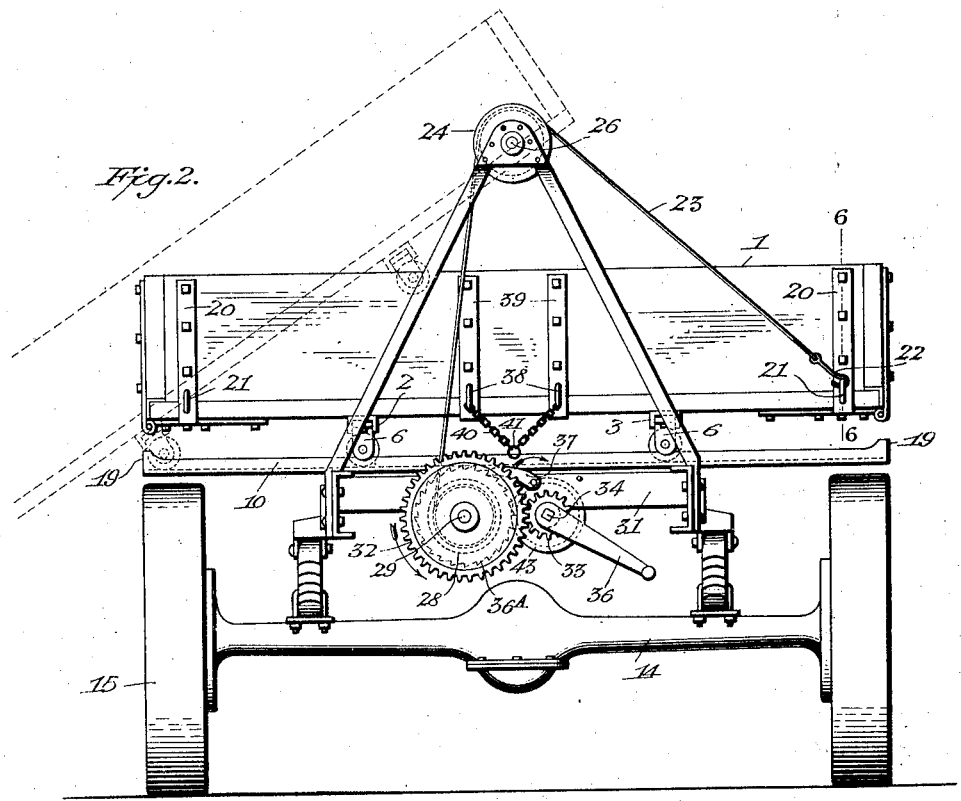
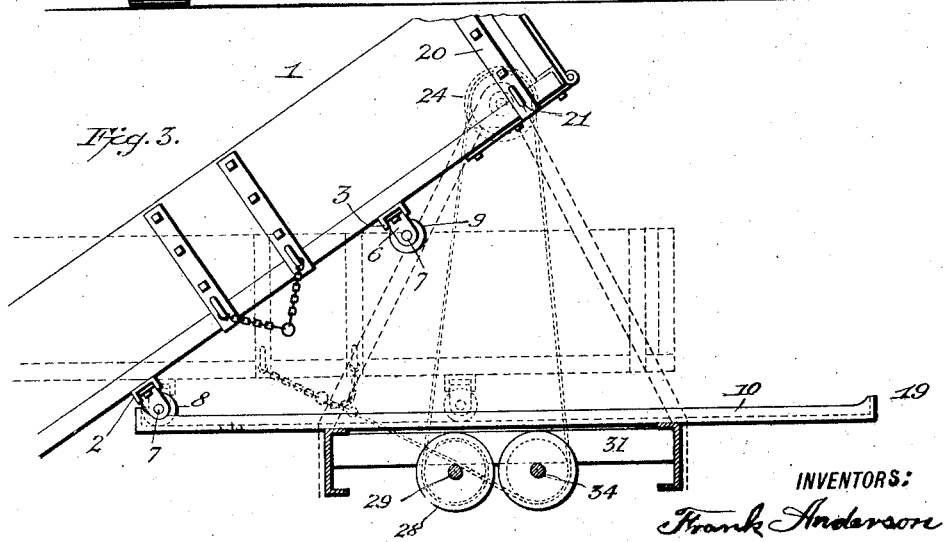
INVENTORS:
Frank Anderson.
Alfred Wild.
By H. S. Bailey ATTORNEY

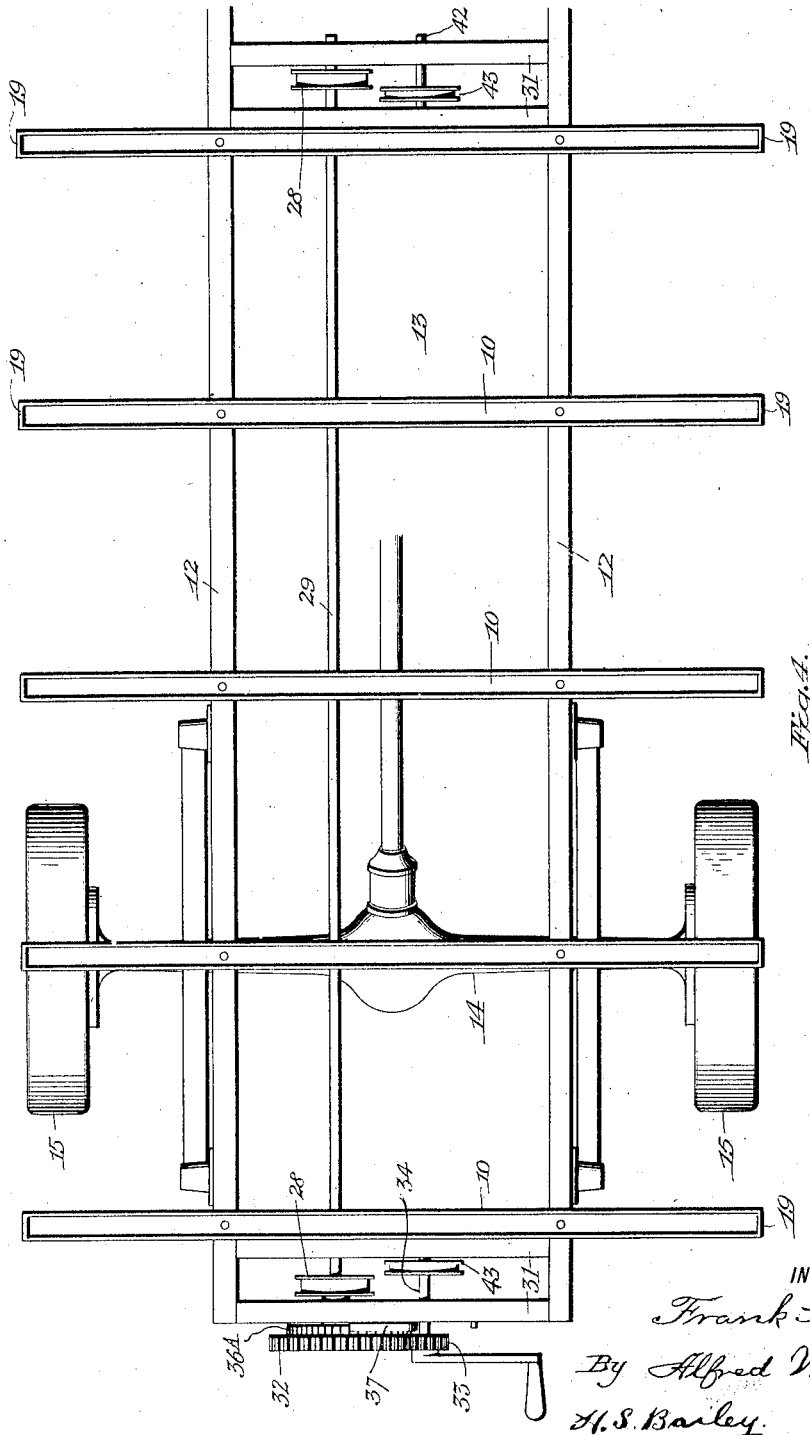

UNITED STATES PATENT OFFICE.

FRANK ANDERSON, OF DENVER, AND ALFRED WILD, OF LOVELAND, COLORADO.

DUMPING-BODY FOR AUTOMOBILE-TRUCKS, WAGONS, FREIGHT-CARS, AND OTHER VEHICLES.

1,328,805.  Specification of Letters Patent.  Patented Jan. 27, 1920.

Application filed April 30, 1919. Serial No. 293,693.

*To all whom it may concern:*

Be it known that we, FRANK ANDERSON and ALFRED WILD, citizens of the United States of America, residing, respectively, at the city and county of Denver and State of Colorado, and Loveland, county of Larimer, and State of Colorado, have invented a new and useful Dumping-Body for Automobile-Trucks, Wagons, Freight-Cars, and other Vehicles, of which the following is a specification.

Our invention relates to a new and improved type of dumping-body for automobile trucks, railway freight cars, wagons and other vehicles, having bodies for holding, conveying and dumping some kinds of merchandise, farm products, railway freight and other articles.

And the objects of our invention are:

First: to provide a rolling dumping-body that can be easily and quickly mounted on and attached to the chassis of the different makes of truck automobiles, and that can also be mounted on and be securely attached to the trucks of railway freight cars and the axle supporting gear of wagons.

Second: to provide a dumping-body for automobile trucks and other produce and freight carrying vehicles that sets low enough down on the chassis of automobile trucks and the trucks of railway freight cars and also on the axle running gear of wagons to be easily loaded by men standing on the ground, without having to lift produce or material above an easy lifting and discharging height.

Third: to provide a dumping body that can be dumped from either side of a truck or car or wagon, and that can be easily raised at either side into any desired angular position that will best allow its load to slide out of it, and that can be raised either by hand or by power.

Fourth: to provide a dumping body that can be locked in the center of the chassis against accidental displacement when a vehicle is moving over a road; and that is simple in construction and practically inexpensive to manufacture, in comparison with dumping bodies that are positioned on vehicles so high that it is with great difficulty that men on the ground load them.

We attain these objects by the mechanism illustrated in the accompanying drawings in which:

Figure 1 is a side elevation of a truck embodying our improved dumping mechanism.

Fig. 2. is an end elevation of the raising and lowering mechanism of the dumping body and also of the dumping body.

Fig. 3. is an end view of a portion of the truck showing the body tilted, and also the manner of attaching the operating cable in drawing the body to a central position on the truck.

Fig. 4. is a plan view of the chassis of the truck, showing the channel form of tracks upon which the body is mounted.

Fig. 5. is a vertical, longitudinal, sectional view of a part of the body of the truck, showing more clearly the manner of mounting the rollers on the bottom thereof.

Fig. 6. is a vertical sectional view—enlarged—on the line 6—6 of Fig. 2. and

Fig. 7. is a perspective view of a portion of the bottom of the body showing the manner in which the same is reinforced along its side edges, and also the strips which cover the seams between the boards composing the body.

Similar letters of reference refer to similar parts throughout the several views.

Referring to the accompanying drawings, the numeral 1 designates a produce holding dumping body embodying our invention. To the opposite ends portions of the underside of this dumping body, we secure along its length steel structral members 2 and 3; either angle irons, girders, trussed plates or channel bars may be used. We preferably, however, use channels and the center of each of them is secured to the bottom of the dumping body, while the side flange of each forms a support for boxes 6, that support the axles 7, which support the dumping body's supporting rollers 8 and 9. Five rollers are employed in each channel, and they are placed on the opposite sides of, and at equal distances apart, on each side of the center.

The outer end rollers 8 and 9 are made of a width to project loosely into channel bars 10, five of these channel bars are shown and one is placed directly underneath each set of rollers. These channel bars form tracks, and they rest on the trussed bars 12 of the chassis 13 of the truck; if desired, however, instead of using channels one may use railroad rails that may be laid on suitable members that will support the weight of the loaded dumping body. These cross tracks 10 can consequently be made of any desired shape and of any suitable material.

The centers of these channel bars are arranged and adapted to be secured rigidly but removably to the longitudinal truck body supporting and trussing bars 12, that connect the front and rear axles 14 on which the wheels 15 are mounted; these general parts with the engine and seat 17 forming the chassis of an automobile truck 18, and our dumping body and its operating mechanism are illustrated mounted on a chassis of a truck embodying these members.

The tracks 10 are placed at the opposite end portions of these chassis bars, and at right angles to the longitudinal center of the chassis of the truck and centrally underneath the rollers 8 and 9.

All the tracks 10 are of equal lengths, and they project across the chassis equal distances from the longitudinal center of the chassis, and they are preferably made of about the same length as the width of the dumping body.

The rollers 8 and 9 are positioned at a short predetermined distance from the sides of the dumping body and from the ends of the track, the distance depending on the width of the body and of the chassis of the truck and the position of the rollers relative to the width of the body and the tracks determines the lateral rolling movement of the dumping body on the chassis.

The lateral rolling movement of the dumping body is limited by raised abutment terminal members 19, against which the rollers strike and thus stop the body. We preferably form these terminal abutments by bending up the ends of the channel bars.

The dumping body is arranged to be rolled laterally from its normal central position on the truck to either side as desired and also to be raised into an angular or tilting dumping position at either side of the truck by the operator of the truck or wagon through easily operated mechanism which is attached to the opposite ends of the dumping body, but it is preferably only operated to raise and tilt the dumping body to discharge a load from its side. In the case however, of railway freight cars of large tonnage capacity, power may be attached to the operating mechanism, if desired, to run the rolling and raising mechanism of the dumping body.

Our invention contemplates in this respect any means by which these movements are made and controlled; we preferably, however, carry out these features of our invention in the following manner, and by means of mechanism that is easily handled by the driver of the truck or wagon.

To the ends of the dumping body near the corners of each of its ends, an eyed strap 20 is secured, and the two eye bolts 21, that are on opposite ends of the same side of the dumping body are adapted to be engaged by eyed-hooks 22, that are attached to two chains 23, which draw the dumping body out to its upward tilting position, and then raise the side the snap-hooks are attached to without removing them, and these snap-hooks are changed from the eye bolts on one side to those on the other during each complete operative dumping movement of the dumping body, as will be explained fully hereinafter.

The chains 23 extend around two sheaves 24, that are revolubly mounted at the upper ends of standards 25, on pins 26, that are secured to the standards. These standards project convergingly upward from the opposite end portions of the truss bars of the chassis adjacent to the opposite ends of the dumping body, and their upper ends meet and are joined together centrally over the longitudinal axles of the chassis, and the sheaves are rotatably mounted in vertical alinement with the longitudinal axis of the chassis.

The two chains 23 extend downwardly from the sheaves 24 to two drums 28, that are secured to a shaft 29, that extends longitudinally through the chassis and is journaled in bearings 30, that are formed in the opposite end bars 31 of the chassis, and at the rear end of the chassis the shaft extends beyond the chassis far enough to receive a gear wheel 32, which is secured to it. A pinion 33, meshes with the gear wheel 32 and is secured on a crank shaft 34, which is rotatably mounted in the adjacent end bars 31 of the chassis, and this crank shaft projects beyond the pinion and it is provided with a squared end on which crank 36 is placed to enable the driver to turn the pinion which rotates the gear and its shaft and the chain drums thereon, which winds or unwinds the chains on the drums to roll the dumping body back and forth on its tracks and raise either side of the truck as desired.

The shaft and chains may be locked against any accidental rotative movement by any suitable locking mechanism. We preferably use, however, a ratchet wheel 36$^A$ which is secured on the shaft on the inside of the gear wheel and pivotally secure a pawl 37 to the side of the end bar of the chassis to swing into mesh into the ratchet teeth of the ratchet wheel and to remain there by its weight which enables it to be lifted up out of the teeth of the ratchet wheel and be swung back out of mesh with it whenever the operator desires to remove it from engagement with the ratchet wheel. If desired the ratchet wheel 37 can be dispensed with and the pawl arranged to mesh with the teeth of the gear wheel 32.

The dumping body may be rolled back centrally on the chassis of the truck and secured there against accidental lateral displacement when the truck is running over roads, by any suitable means, and our invention contemplates the use of any mechanism for returning the dumping body and for firmly locking the dumping body to the chassis. We preferably employ, however, in order that the dumping body may be quickly and easily released from the chassis, the use of two hooks 38, that are secured to straps 39, which are secured to the central portion of the opposite ends of the dumping body; a chain 40, that is provided with a ring 41 at its center is attached at its opposite ends to these hoops; in addition to the crank shaft a stub shaft 42 is secured to the opposite end of the chassis and on the inner end of these two shafts idler sheaves 43 are placed adjacent to the drums. These idler sheaves are used to place the chains around when the body is moved back to the center of the chassis at which time the chains are released from the eye bolts of the body and are placed around these idler sheaves 43, the hooks 22 are then hooked into the rings 41, of the chains 40, and by operating the crank 36, the chains 23, draw the body back to its normal position on the chassis, as will be understood by the dotted lines in Fig. 3.

The dumping body is also held centrally on the chassis after being drawn back into its central position on the body by winding up the lifting chains tightly on their drums and without removing the chains from the idler sheaves 43, and then locking the gearing with the pawl when tightened up. Consequently the dumping body is firmly secured to the chassis at all times and under all conditions except when and during its dumping movements.

The operation is as follows:

The driver of the truck is also the operator of the dumping mechanism which is manipulated by him to roll the dumping body laterally out to its dumping position and to raise one side of it up into dumping position in the following manner: Assuming that the driver desires to dump on the right hand side of the truck, he first connects the hooks into the eyes at the left hand side of both ends of the body portion of the truck, and then grasping the crank handle he turns the pinion to wind the chain around the drum which causes the dumping body to roll on its rollers on its tracks, to and against the upwardly projecting terminal abutments at their ends, which is the limit of the dumping body's lateral rolling movement; the operation may stop at this point to either raise or remove the side of the dumping body the load is to be discharged from if he so desires and then continue the winding movement of the chains; or he may continue the winding movement from the time he commences it; in either event the chains drawing on the side of the dumping body hold the dumping body's rollers against the abutments and at the same time raise the side the chains are connected to up high enough to allow the load in the dumping body to slide out of it; that is if the side of the body was raised after the body was rolled against its track abutments; or as soon as the side is removed or raised after the body is tilted up far enough to allow the load to slide from it, as the operator can hold the body in its raised and tilted position by locking the gear and shaft with the ratchet pawl and hold it locked until the body is fully unloaded. Having unloaded the body, the operator releases the ratchet pawl and unwinds the chains to lower the raised end of the body back onto its tracks. He then unhooks the chains from the eyes and then passes them around the idler sheaves 43, after which he hooks the chains to the ring 41, at the center of the ends of the dumping body and then winds the chains to draw the body back into the center of the chassis of the truck. The operator after he has moved the chassis back to the center of the body turns the crank to tighten the chains and then locks the gears and the drums and chains in this tightened condition by inserting the pawl; the body is then secured to the truck firmly and tightly against any possible chance of accidental displacement.

Our invention provides a dumping body truck low enough to the ground to enable it to be easily loaded, as for the case of farmers harvesting sugar beets, potatoes, and other crops, they can be tossed into the body and in the case of sacked wheat, oats, etc., they can be as easily loaded by simply discharging them from the shoulders of men carrying the filled sacks without lifting them any higher, and they can all be quickly dumped into bins or into railway freight cars, from our dumping body.

Our low dumping body truck is also of strong and durable construction, and while we have illustrated its preferred construction, changes may be made in it without departing from the spirit of our invention.

Having described our invention, what we claim as new and desire to secure by Letters Patent, is:

1. The combination with a chassis having channeled tracks thereon, of a body, having rollers which rest in said tracks, means for limiting the rolling movement of said body on said tracks, and means including gear operated drums for raising either side of said body into a dumping position, said means including flexible members wound upon said drums and arranged to be removably connected to the opposite corner portions of the opposite ends of said dumping body to be alternately changed from one corner to the opposite corner of the opposite ends of said dumping body; and means including a pawl and ratchet mechanism for locking said dumping body to said chassis; and a ring on said body to which said flexible connections may be attached whereby the body may be drawn to its normal position on the chassis, and held against lateral movement.

2. In a dumping body for automobile trucks; the combination of the laterally moving body, transverse tracks secured to said truck under said body and rollers secured to the opposite edges of said body, and arranged to run on said tracks; said tracks being provided with upwardly projecting terminal abutments at their ends adapted to be engaged by said rollers at the end of said body's lateral movement; eye bolts at the edges of both ends of said body, a chain connecting the center eye bolts of each end of the body, having a central ring, drums, chains wound upon said drums having hooks, and crank operative gearing for operating said drums, said hooks being adapted to engage the eye bolts, in the dumping operation, and the rings, when it is desired to return the body to its normal position.

3. The combination in a dumping body for trucks of a truck chassis provided with a shaft extending longitudinally of it, a gear or ratchet wheel mounted on said shaft, a pawl pivoted to said chassis in disengaging mesh relation to said wheel, a crank shaft and a pinion mounted on said chassis in mesh with said gear, drums secured on said shaft and standards projecting above said chassis of said truck, sheaves rotatably mounted on the upper end of said standards, a dumping body having a predetermined lateral movement on said chassis, means including chains connected with said drums and extending over the sheaves on said standards, and adapted to be connected with the dumping body for moving said dumping body into a dumping position, and means including idler chain receiving sheaves adjacent to said drums around which said chains are passed for drawing said dumping body back on said chassis after it has been tilted into dumping position.

4. The combination with a dumping body for trucks of a truck chassis provided with a shaft extending longitudinally of it having drums thereon, a gear mounted on said shaft, a pawl and ratchet wheel mounted on said shaft, a pawl pivoted to said chassis in disengaging mesh relation to said ratchet wheel, a crank shaft and a pinion mounted on said chassis in mesh with said gear, at one end of said dumping body, a stub shaft at its opposite end, idler chain receiving sheaves on said shafts adjacent to said drums and arranged to receive the chains therefrom after tilting the dumping body, and standards projecting above said chassis of said truck, sheaves rotatably mounted on the upper ends of said standards, said dumping body having a predetermined lateral movement on said chassis, means including hook ended chains or ropes secured to said drums and extending over the sheaves of said standards for rollingly moving said dumping body laterally on said chassis and for raising it into a tilting dumping position, and rings on said body to receive said hooks for moving said body to the center of said chassis.

5. The combination with a dumping body for trucks having rollers thereon, of a truck chassis having tracks thereon to receive said rollers and provided with a shaft extending longitudinally of it, a gear mounted on said shaft, a ratchet wheel mounted on said shaft, a pawl pivoted to said chassis in disengaging mesh relation to said ratchet wheels, a crank shaft and a pinion mounted on said chassis in mesh with said gear, drums secured on said longitudinal shaft and standards projecting above said chassis of said truck, sheaves rotatably mounted on the upper ends of said standards, said dumping body having a predetermined lateral movement on said chassis, and means including hook ended chains or ropes secured to said drums and extending over the sheaves of said standards for rollingly moving said dumping body laterally on said chassis and for raising it into a tilting dumping position, said tracks being secured to said chassis at right angles to its length, stop abutments on the opposite ends of said tracks adapted to be engaged by said rollers to define the lateral movement of said dumping body and eye bolts in the end corners of the opposite ends of said body, two separated eyes in the central portion of said body, a chain secured at its ends to said eyes and provided with a ring at its center, said ring being adapted to receive the hooked ends of said chains, whereby said dumping body is rolled back to the center of said chassis and held against accidental lateral displacement.

6. In a dumping body for automobile trucks, the combination of the laterally moving body, transverse tracks secured to said truck under said body and rollers secured to the opposite side edges of said body, and arranged to run on said tracks, said tracks being provided with upwardly projecting terminal abutments at their ends adapted to be engaged by said rollers at the end of said body's lateral movement, and means including drums, a crank shaft, chains and gears for rolling said body against the abutments of said tracks and for raising said body into a load dumping position, a sheave loosely mounted on said crank shaft at one end of said dumping body and a sheave on a stub shaft at its opposite end and positioned to receive said chains from said drums when the body is to be drawn back on said chassis, whereby said dumping body is rolled back to the center of said chassis and held against accidental lateral displacement.

7. In a device of the character described, the combination with a truck frame, a longitudinal shaft thereon having drums at its opposite ends, short shafts at opposite ends of said frame having idle pulleys, gearing connecting one of said short shafts and the longitudinal shaft and a crank handle on said latter shaft, short, transverse channeled tracks on said frame having stops at their opposite ends, and uprights having sheave wheels thereon, of a body having rollers which rest in said tracks, eyes at opposite corners of each end of said body, and centrally positioned rings attached to each end of said body, and flexible connections attached to said drums and extending over said sheaves, said flexible connections having hooks to engage the said eyes to slide said body laterally in either direction and tilt the same, said flexible connections being passed around the idle pulleys on the short shafts with their hooks engaging said rings, to draw said body to a central position on the frame and hold the same against lateral movement.

In testimony whereof we affix our signatures in presence of two witnesses.

FRANK ANDERSON.
ALFRED WILD.

Witnesses:
G. SARGENT ELLIOTT,
EMILY ROBERTS.